US008112393B2

(12) United States Patent
Kumar et al.

(10) Patent No.: US 8,112,393 B2
(45) Date of Patent: Feb. 7, 2012

(54) DETERMINING RELATED KEYWORDS BASED ON LIFESTREAM FEEDS

(75) Inventors: Mani Kumar, Dhampur (IN); Pankaj Kothari, Bangalore (IN); Saurabh Sahni, Indore (IN)

(73) Assignee: Yahoo! Inc., Sunnyvale, CA (US)

( * ) Notice: Subject to any disclaimer, the term of this patent is extended or adjusted under 35 U.S.C. 154(b) by 384 days.

(21) Appl. No.: 12/329,443

(22) Filed: Dec. 5, 2008

(65) Prior Publication Data
US 2010/0145939 A1 Jun. 10, 2010

(51) Int. Cl.
*G06F 7/00* (2006.01)

(52) U.S. Cl. .......................... 707/632; 707/736

(58) Field of Classification Search .................. 707/705, 707/709, 713, 754, 689, 700, 662, 666, 769, 707/758, 759, 732–734, 736, 766, 767, 613, 707/628, 631, 632, 706, 707, 710, 999.01, 707/E17.107; 715/738, 758, 759
See application file for complete search history.

(56) References Cited

U.S. PATENT DOCUMENTS

| | | | |
|---|---|---|---|
| 6,212,517 B1 | 4/2001 | Sato et al. | |
| 6,876,997 B1 | 4/2005 | Rorex et al. | |
| 7,328,401 B2 | 2/2008 | Obata et al. | |
| 7,693,825 B2 * | 4/2010 | Wang et al. | 707/723 |
| 7,716,199 B2 * | 5/2010 | Guha | 707/706 |
| 7,856,445 B2 * | 12/2010 | Gross | 707/771 |
| 2009/0112935 A1 * | 4/2009 | Hefta-Gaub | 707/200 |
| 2009/0222348 A1 * | 9/2009 | Ransom et al. | 705/14 |
| 2009/0234876 A1 * | 9/2009 | Schigel et al. | 707/102 |
| 2010/0023399 A1 * | 1/2010 | Sahni et al. | 705/14.53 |
| 2010/0094939 A1 * | 4/2010 | Cheng et al. | 709/206 |
| 2010/0114946 A1 * | 5/2010 | Kumar et al. | 707/770 |

OTHER PUBLICATIONS

Word Spy—lifestreaming, http://wordspy.com/words/lifestreaming.asp, accessed Sep. 15, 2008, 3 pgs.
Aggregator—Wikipedia, http://en.wikipedia.org/w/index.php?title=Aggregator&printable=yes, accessed Sep. 15, 2008, 3 pgs.
Expectation—maximization algorithm, Wikipedia.org, http://en.wikipwdia.org/w/index.php?title=Expectation-maximization, accessed Sep. 3, 2008, 9 pgs.
Life Stream Aggregators vs. Standard Social Networking, razorshine, http://www.razorshine.com/archive/2008/04/11/life-stream-aggregators-do-vs-standard-soc, accessed Nov. 6, 2008, 6 pgs.

(Continued)

*Primary Examiner* — Greta Robinson
(74) *Attorney, Agent, or Firm* — Frommer Lawrence & Haug LLP; Jamie L. Wiegand

(57) ABSTRACT

Embodiments are directed towards providing related keywords determined to be relevant to a search term using life-streaming data to identify the related keywords. Relevancy is determined by performing the related keyword analysis when life-stream services have been updated. Related keywords may be identified for a given search term using a combination of an aggregated life-stream analysis, a user profile based analysis, and/or a community based life-stream analysis. Each of these mechanisms identify a subset of updated life-streams or profiles to be analyzed to identify keywords that co-occur within each life-steam along with the given search term. The resulting co-occurring keywords may then be ordered based on a frequency of occurrence for the subset of life-streams. A weighted combination of the identified related keywords may be used to display related keywords to a user for use in modifying a search query.

20 Claims, 5 Drawing Sheets

OTHER PUBLICATIONS

K-means algorithm—Wikipedia.org, http://en.wikipedia.org/w/index.php?title=K-means_algorithm&prin, accessed Nov. 6, 2008, 5 pgs.

FriendFeed—About Us, http://friendfeed.com/about/, 2 pgs, accessed Nov. 6, 2008.

MyBlogLog.com, http://www.mybloglog.com/, accessed Nov. 6, 2008, 1 pg.

Topic: apple, http://www/mybloglog.com/buzz/topics/apple, accessed Sep. 23, 2008, 11 pgs.

* cited by examiner

DETERMINING RELATED KEYWORDS BASED ON LIFESTREAM FEEDS

TECHNICAL FIELD

The present invention relates generally to performing searches over a network and, more particularly, but not exclusively to providing related keywords to a search term useable for searching based on analysis of life-stream feeds.

BACKGROUND

Tremendous changes have been occurring in the Internet that influence our everyday lives. For example, in today's society, one of the first activities that a user might perform when turning on their computers is to start up their search tools. In fact, use of Internet search tools have been so common, that it is not uncommon to see a person on a bus, train, or even a boat, to be using their mobile devices to search for merchants, restaurants, music, businesses, friends, or the like.

However, performing a search query for user relevant information still remains cumbrous. A quality of a search result is often directly dependent upon the search terms that the user enters. The entry of one search query may not result in relevant search results, while the entry of another, sometimes based merely on a slight change in the terms in the query, may result in a more relevant search result. Therefore, the user might have to perform several search queries to obtain relevant search results. Irrelevant search results mean that the user is less likely to find what they are looking for, which in turn may translate into lost opportunities for merchants, or other businesses, to prosper from the user. Irrelevant search results may also mean lost opportunities to the searcher with respect to building new relationships, lost job opportunities, lost purchase or sale opportunities, or the like. Therefore, many businesses are searching for new ways to make search results more relevant to the user. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
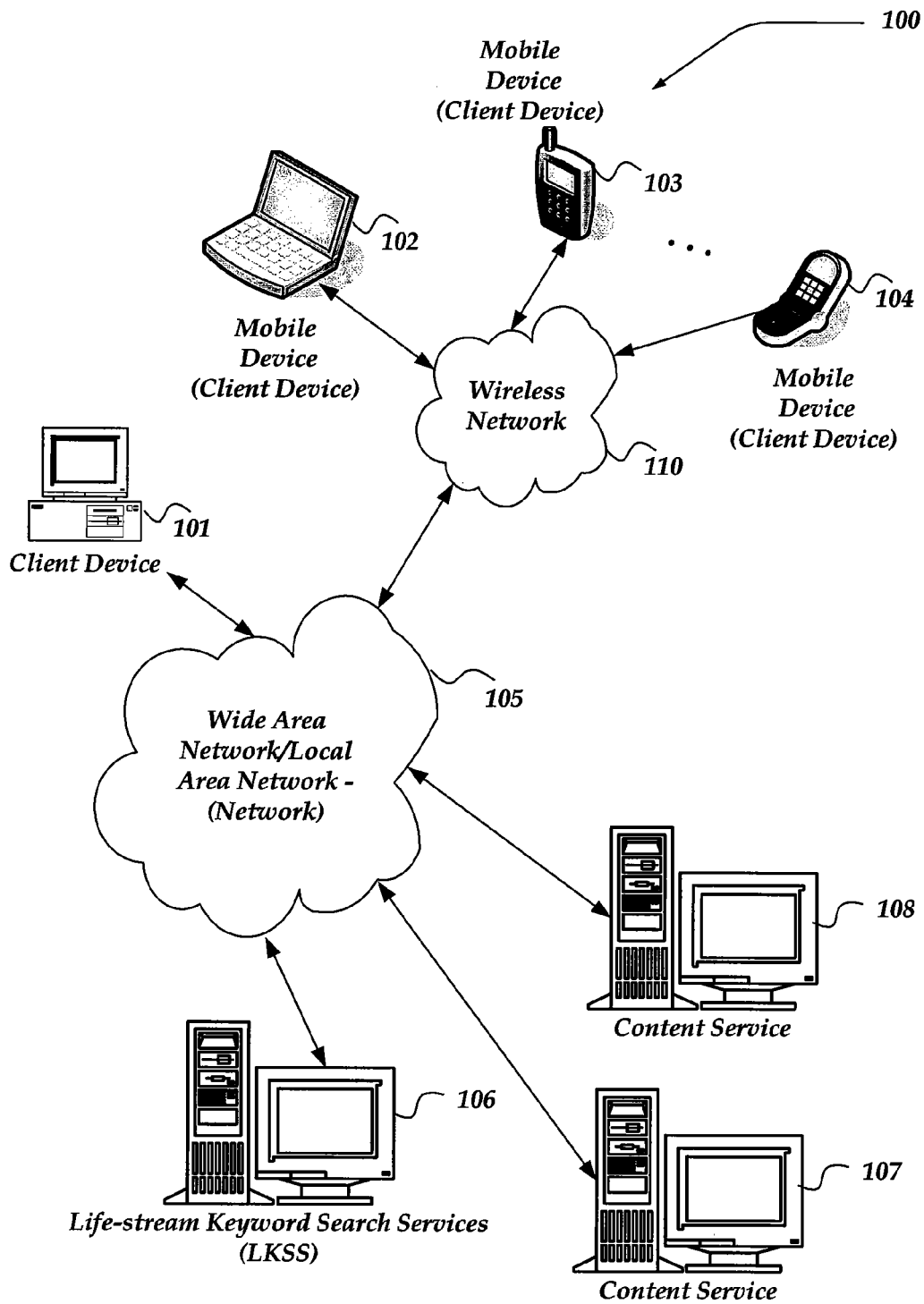
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, an aggregator is a network application that is directed toward checking various specified network sites for changes in content, and if a change is detected, retrieves the update for use by a requester. Aggregators are directed towards reducing the time and effort needed by a user to regularly check various websites for updates. The aggregator often performs such tasks, instead. Once a user subscribes to an aggregator, the aggregator checks various specified websites for changes in content, and if a change is detected, retrieves the update. The updates may then be provided to the subscriber, often in a single stream. One type of aggregator that has recently become popular is known as life-streaming aggregators, or simply life-streaming. Life-streaming aggregators create an online record of a user's daily activities by aggregating their online content from various services, such as blog posts, vlog posts, online photo sites, and/or any of a variety of other specified social network sites. Users may provide their usernames for different sites, such as Flickr, YouTube, last.fm, Netflix, twitter, delicious, dig, or any of a variety of other sites (to name just a few). The life-streaming aggregator crawls the identified sites and aggregates or collects updates for the users. Services, as used herein refer to any of a variety of networking activities, including, but not limited to those identified above. For example, a photo website, blog site, video site, online dating site, and the like, are non-exhaustive, non-limiting examples of services for which an aggregator might monitor for updates.

As used herein, the term "keyword" refers to words, phrases, symbols, and/or combinations of words, phrases, or symbols upon which a network search may be performed. Keywords may be explicitly entered into a website, user profile, or the like by a user associated with the website, or user profile. Such keywords, typically, but not exclusively entered using tags, labels, or the like, are used to assist in searching for items over the network. Keywords may also be entered by readers or viewers of a given website, or otherwise determined by an analysis of content provided on a give webpage, website, user profile, or the like.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated the present invention is directed towards suggesting related keywords determined to be relevant to a search term using life-streaming data to identify the related keywords. Relevancy is determined, in one embodiment, by performing the related keyword analysis virtually in real-time, when life-stream services are detected to have been updated. Thus, relevancy of related keywords may change over time. Briefly, related keywords may be identified for a given search term using a combination of two or more of the following mechanisms. In a first mechanism, known as aggregated life-stream analysis, a plurality of life-stream updates across a plurality of different users is identified. Each of the updated life-streams are then searched to identify a subset of life-streams having the given search term. The subset of life-streams are analyzed to identify keywords that co-occur within each life-steam of the subset along with the given search term. The resulting co-occurring keywords may then be ordered based on a frequency of occurrence for the subset of life-streams. In a second mechanism, known as a user profile based life-stream analysis, user profiles are analyzed across updated life-streams to identify users that have included the given search term within their user profiles, explicitly and/or implicitly. The subset of life-streams identified are then further analyzed to identify keywords that co-occur with each life-stream along with the given search term. Again, the resulting co-occurring keywords may then be ordered based on a frequency of occurrence for the subset of life-streams. In a third mechanism, known as a community based life-stream analysis, one or more communities are identified with the set of updated life-streams that employ the given search term. The subset of life-streams of communities are then analyzed to identify keywords that co-occur within each life-steam of the subset along with the given search term. The resulting co-occurring keywords may then be ordered based on a frequency of occurrence for the subset of life-streams.

The related keywords identified by two or more of the above mechanisms are then combined using a weighting mechanism, in one embodiment. At least a subset of the combination of weighted related keywords may then be displayed to a search user for use in modifying their search query.

In one embodiment, a sliding window might be used to phase out/in related keywords over time. Thus, in one embodiment, a prior set of life-streams that have been updated within a sliding window of a defined time window length may be used. However, other phasing mechanisms may also be used, to age out related keywords over time, and thereby improve relevancy of the identified related keywords to the given search term.

It is noted that while it is described above that two or more of the above mechanisms may be combined, the invention is not so limited. For example, in one embodiment, any one of above life-steam analysis mechanisms may be used independent of the other mechanisms to identify and provide related keywords to a search term.

In one embodiment, the related keywords may be used to modify a search query. Thus, in one embodiment, the search term might represent one or more terms within a search query. However, it should be recognized that while the invention is described within the context of search queries, the invention is not so limited. Thus, for example, providing to a user related keywords based on a life-stream analysis may also be implemented within the context of topical web pages, and/or other social networking contexts, without departing from the scope or spirit of the invention.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, Life-stream Keyword Search Services (LKSS) 106, client devices 101-104, and content services 107-108.

One embodiment of client devices 102-103 is described in more detail below in conjunction with FIG. 2. Generally, however, client devices 102-104 may include virtually any portable computing device capable of receiving and sending a message over a network, such as network 105, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including social networking information, performing search queries, or the like. Client device 101 may also include client applications such as those described above, as well as being configured to provide location information.

The set of such devices may include devices that typically connect using a wired or wireless communications medium such as personal computers, multiprocessor systems, microprocessor-based or programmable consumer electronics, network PCs, or the like. Moreover, at least some of client devices 102-104 may operate over wired and/or wireless network.

A web-enabled client device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform a search over a network. However, another application may also be used to perform a search over the network.

Client devices 101-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, client devices 101-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a network packet, or the like, sent to LKSS 106, content services 107-108, or other computing devices.

Client devices 101-104 may further be configured to include a client application that enables the end-user to log into an end-user account that may be managed by another computing device, such as content services 107-108, LKSS 106, or the like. Such end-user account, for example, may be configured to enable the end-user to receive subscribe to one or more RSS feeds, aggregation feeds, or any of a variety of other social networking activities. However, participation in various social networking activities, including participation in receiving aggregation feeds, or the like, may also be performed without logging into the end-user account.

In one embodiment, client devices 101-104 may employ one or more client applications to interact with content services 107-108 to provide content/services and/or access content and/or services. In one embodiment, such content and/or services may include providing and/or accessing blog content, vlog content, music audio content, content, textual content, content feeds, messages, graphical content, or any of a variety of social networking content and/or services. However, client devices 101-104 are not constrained to providing and/or accessing social networking content/services and virtually any other form of content/services may be accessed and/or provided using client devices 101-104.

In one embodiment, a user of client devices 101-104 might host various content on one or more of content services 107-108, wherein the hosted content may be made accessible to others. In one embodiment, the user might register with content services 107-108 to be able to host such content. In one embodiment, part of the registration may include providing information useable within a user profile about the user. The provided information might include, but is not limited to a user name, network address, and information about the content to be hosted, interests of the user, or the like. For example, in one embodiment, a user might provide for use in a user profile keywords identifying topics for which the user might be interested in, and/or topics for which the user may post articles, or other content about.

In one embodiment, a user hosting content on one or more of content services 107-108 (often known as a content author) might provide keywords for a given content item. For example, where the user selects to post an article about a particular music video, the user might include keywords useable by others that might include words, such as "music," "video," rock and roll, or the like. Keywords entered by the user (content author) about the user and/or the user's interests are defined as explicit keywords, while keywords entered by the user about the user's hosted content are defined as implicit keywords.

Client devices 101-104 may also be configured to enable a user to perform a search query for content from one or more of content services 107-108. Client devices 101-104 might employ LKSS 106 to enable a search result to be obtained from a search query. As described in more detail below, along with a search result, client devices 101-104 may be provided with one or more keywords that are determined to be related to one or more terms in the user's search query. Such related keywords may be identified based on a subset of life-steam feeds selected based on one or more mechanisms.

Wireless network 110 is configured to couple client devices 102-104 and its components with network 105. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 105 is configured to couple network devices with other computing devices, including, LKSS 106, content services 107-108, client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of LKSS 106 is described in more detail below in conjunction with FIG. 3. Briefly, however, LKSS 106 may include any computing device capable of connecting to network 105 to provide related keywords determined to be relevant to a search term using life-streaming data to identify the related keywords. Relevancy as used herein may be determined by performing the related keyword analysis when life-stream services have been updated. Related keywords may be identified for a given search term using a weighted combination of one or more aggregated life-stream analysis, user profile based life-stream analysis, and/or a community based life-stream analysis. LKSS 106 may identify a subset of updated life-streams to be analyzed to identify keywords that co-occur within each life-steam along with the given search term. LKSS 106 may then provide a weighted combination of the identified related keywords to a searching client device for use in modifying a search query.

LKSS 106 may receive information about the life-streams from content services 107-108, through a life-stream manager component configured to aggregate services for users, and/or through information provided by one or more users of client devices 101-104. Additionally, LKSS 106 may receive other information about various services hosted by content services 107-108, include user profile information about users posting content, keyword information about various posted content, and/or other information. For example, in one embodiment, content services 107-108 and/or the life-stream manager component may be configured to indicate when a life-stream has been updated, a content service associated with a life-stream has been updated, or the like. LKSS 106 may employ a process such as described in more detail below in conjunction with FIG. 4 to perform at least some of its actions.

Devices that may operate as LKSS 106 include various network devices, including, but not limited to personal computers desktop computers, multiprocessor systems, microprocessor-based or programmable consumer electronics, network PCs, servers, network appliances, and the like.

Although FIG. 1 illustrates LKSS 106 as a single computing device, the invention is not so limited. For example, one or more functions of LKSS 106 may be distributed across one or more distinct computing devices. For example, updating information about a user profile, a life-stream update, a service update, or the like, may be performed by one network device, while determining related keywords to a search term may be performed by still another computing device, without departing from the scope or spirit of the present invention. However, other arrangements may also be employed. Thus, the invention is not to be limited to any particular distribution of functions, and a variety of arrangements is envisaged and is within the scope of the invention.

Content services 107-108 represents any of a variety of network devices to provide content and/or services accessible by client devices 101-104. Such services include, but are not limited to merchant sites, educational sites, news sites, personal sites, music sites, video sites, blog sites, vlog sites, and/or any of a variety of social networking sites. In fact, content services 107-108 may provide virtually any content and/or service that a user of client devices 101-104 may want to provide to another person. For example, such content may include, but is not limited to photographs, articles, advertisements, news, editorials, messages such as, but not limited to those messages known as tweets, or the like.

Devices that may operate as content servers 107-18 include personal computers desktop computers, multiprocessor systems, microprocessor-based or programmable consumer electronics, network PCs, servers, and the like.

Illustrative Client Device

Figure 2:
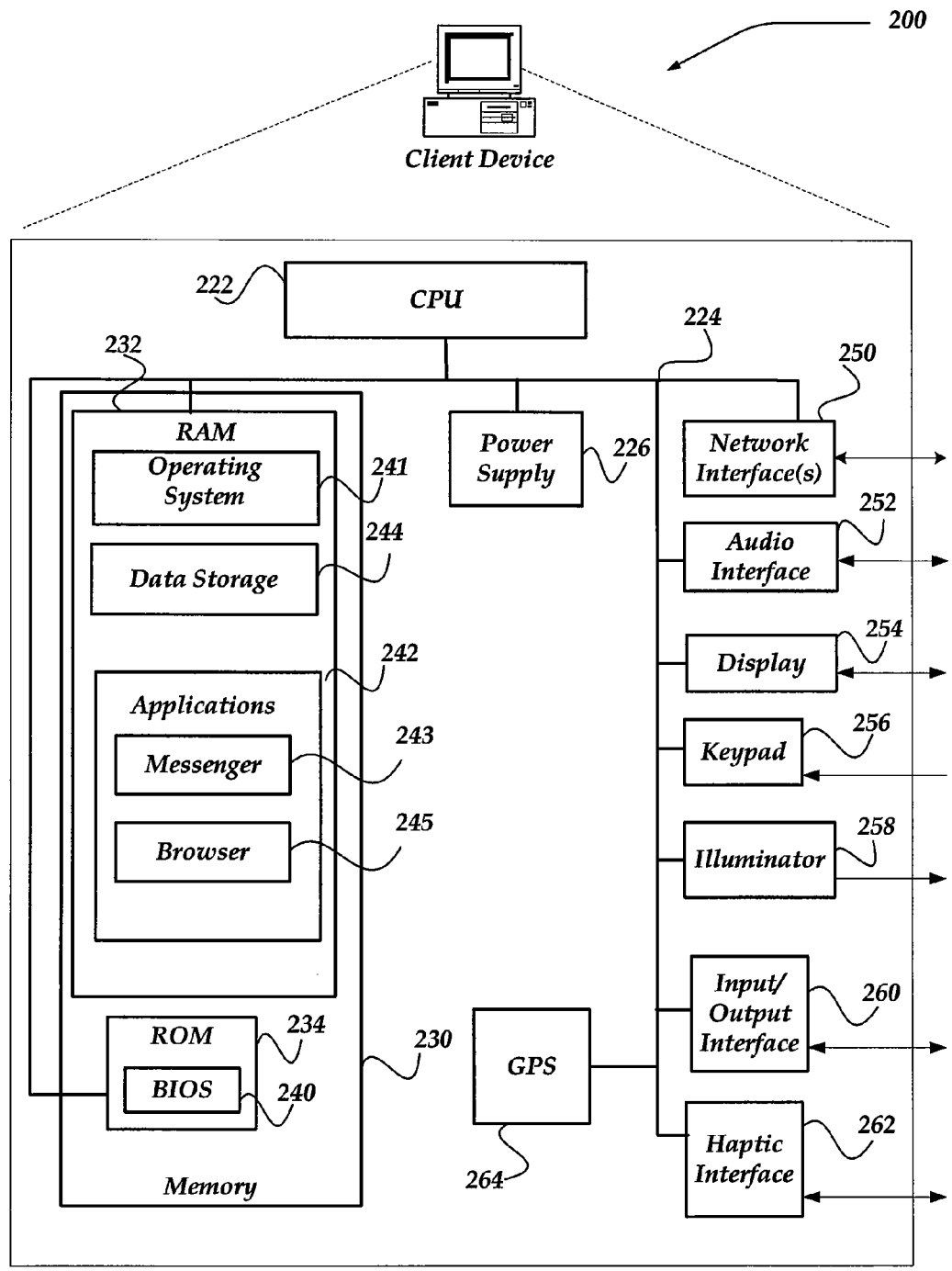
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store social networking information including address books, buddy lists, aliases, user profile information, or the like. At least a portion of the information may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. Applications 242 may include, for example, messenger 243, and browser 245.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed.

In one embodiment, browser 245 may be configured to enable access to a search application, such as might be available through LKSS 106 of FIG. 1. In one embodiment, a user of client device 200 may input to the search application a variety of search terms for use in obtaining a search results. In another embodiment, the user might employ a life-stream search tool that provides a list of one or more keywords that are determined to be relevant to one or more search terms the user's search query. Because relevancy includes a time dependency, such related keywords may be different over time.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, RSS feeds, and/or the like. For example, in one embodiment, messenger 243 may be configured as an IM application, such as AOL Instant Messenger, Yahoo! Messenger, NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols, including, but not limited to various push and/or pull mechanisms for client device 200.

Illustrative Network Device

Figure 3:
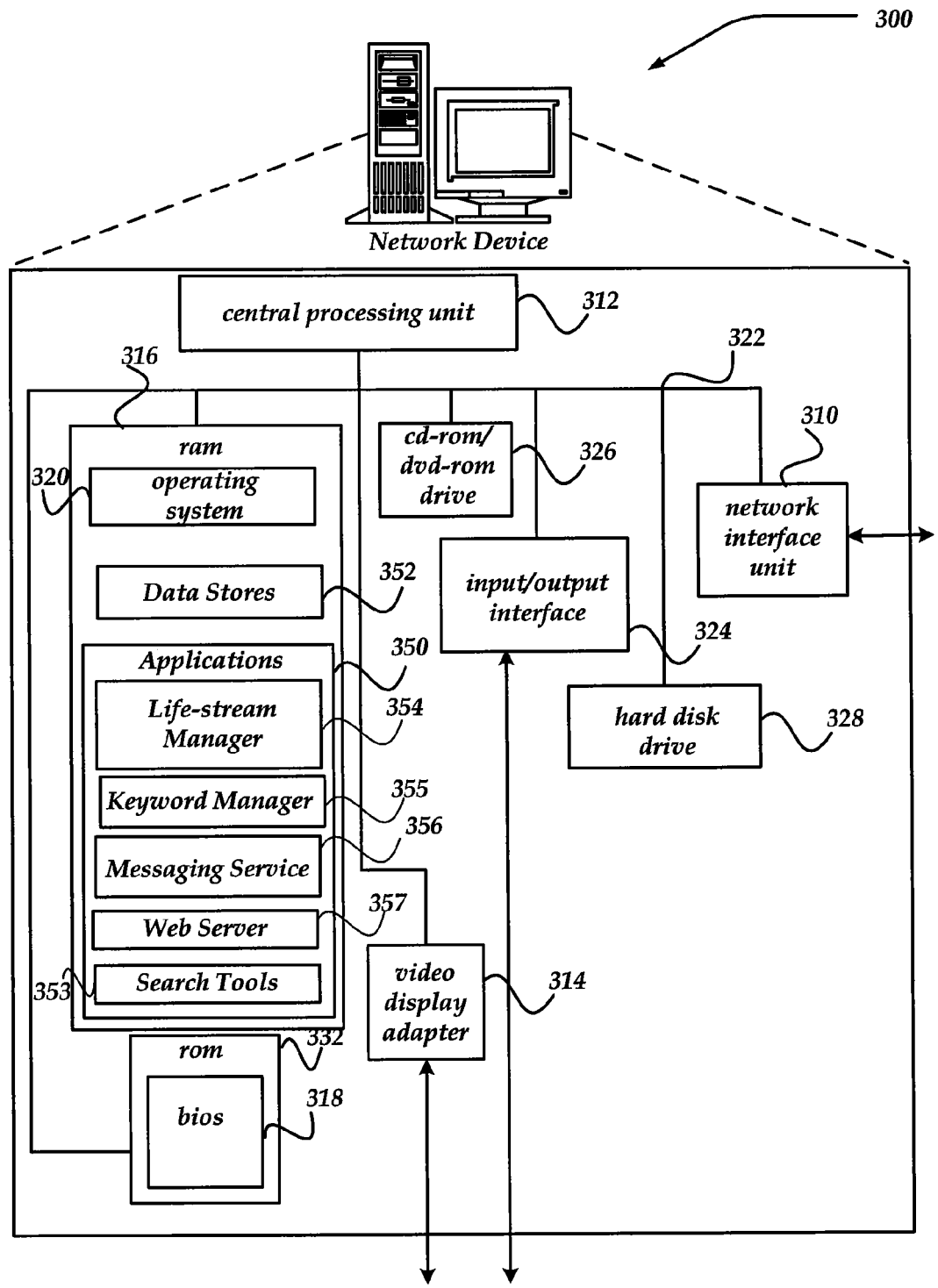
FIG. 3 shows one embodiment of a network device that may be included in a system implementing the invention.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, LKSS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

As shown, data stores 352 may include a database, text, spreadsheet, folder, file, or the like, that may be configured to maintain and store subject matter specificity classifier data, threshold values, training documents, document feature sets, search parameter selections for a given searcher, one or more lists of sites over which a search is to be performed, search results, or the like. In one embodiment, at least some of data store 352 might also be stored on another component of network device 300, including, but not limited to cd-rom/dvd-rom 326, hard disk drive 328, or the like.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Web server 357, messaging server 356, search tools 353, and keyword manager 355, and life-stream manager 354 may also be included as application programs within applications 350.

Web server 357 represent any of a variety of services that are configured to provide content, including messages, over a network to another computing device. Thus, web server 357 includes for example, a web server, a File Transfer Protocol (FTP) server, a database server, a content server, or the like. Web server 357 may provide the content including messages over the network using any of a variety of formats, including, but not limited to WAP, HDML, WML, SMGL, HTML, XML, cHTML, xHTML, or the like.

Messaging server 356 may include virtually any computing component or components configured and arranged to forward messages from message user agents, and/or other message servers, or to deliver messages to a local message store, such as data store 354, or the like. Thus, messaging server 356 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, or the like. Messaging server 356 may also be managed by one or more components of messaging server 356. Thus, messaging server 356 may also be configured to manage SMS messages, IM, MMS, IRC, RSS feeds, mIRC, or any of a variety of other message types. In one embodiment, messaging server 356 may enable users to initiate and/or otherwise conduct chat sessions, VOIP sessions, or the like, based at least in part on a search query. Thus, in one embodiment, messaging server 356 may be configured to interact with web server 357 for use in messaging sessions.

Search tools 353 includes virtually any applications, scripts, robots, spiders, and/or other components useable to crawl various sites over a network for content. In one embodiment, search tools 353 may receive a request for a search query, and employ information obtained during crawling to provide a result to the search query. In one embodiment, search tools 353 may provide the search query to keyword manager 355 for use in determining related keywords to the one or more terms in the search query.

Search tools 353 may be accessed by a user through web server 357, which provides a user interface displayable at a user's computing device, such as client devices 101-104. In one embodiment, the user interface may also provide a list of the related keywords obtained from keyword manager 355, for which the searching user may use for modifying the search query.

Life-steam manager 355 includes virtually any applications, scripts, robots, spiders, and/or other components useable to crawl various sites over a network for content. In one embodiment, Life-steam manager 355 may include one or more aggregation services that are configured to crawl various sites and identify changes to content at a site. If the content is detected as having changed for a given site, based on some criteria, Life-steam manager 355 may collect or aggregate the changes and provide a requesting user an alert indicating that content has changed, provide a link to the changed content, and/or provide the changed content. In one embodiment, Life-steam manager 355 might provide the alert or some other signal to keyword manager 355 for use in identifying related keywords to terms within a search query.

While life-stream manager 355 and search tools 353 are illustrated as distinct components, the invention is not so limited. Thus, in another embodiment, life-stream manager 355 and search tools 353 may be integrated into a single component without departing from the scope of the invention.

Keyword manager 355 is configured to receive updates to life-streams from life-stream manager 355, receive a search query from search tools 353, and identify relevant related keywords to one or more terms within the search query for display at a computing device associated with a searcher. In one embodiment, search results and the relevant related keywords may be displayed at a client device, such as client devices 101-104 of FIG. 1, using a user interface such as described in more detail below in conjunction with FIG. 5.

Keyword manager 355 may also receive a variety of other information, including, but not limited to user profiles, content, or the like, for use in identifying the relevant keywords. The related keywords may be identified for a given search term using a combination of two or more of an aggregated life-stream analysis, a user profile based analysis, and/or a community based life-stream analysis, each of which are described in more detail below in conjunction with process 400 of FIG. 4. Briefly, however, each of these mechanisms are configured to identify a subset of updated life-streams to be analyzed to identify keywords that co-occur within each life-steam of the subset along with the given search term. The resulting co-occurring keywords may then be ordered based on a frequency of occurrence for the subset of life-streams. A weighted combination of the identified related keywords is then provided to the search user for use in modifying their search query.

In one embodiment, keyword manager 355 may employ a sliding window to phase out/in related keywords over time. Thus, in one embodiment, a prior set of life-streams that have been updated within a sliding window of a defined time window length may be used. As the window slides in time, some life-stream updates may be discarded from the analysis, while others may be added. Moreover, in one embodiment, more recently added life-streams might be weighted higher than 'older' life-streams, to provide an increased emphasis on more current updated life-streams. However, the invention is not so limited, and other approaches may be used. In one embodiment, the sliding window might be configured to include between about 100-200 updated life-streams for each of the above mechanism. However, other values may also be selected, and thus, the invention is not to be construed to be limited to these values. Moreover, other phasing mechanisms may also be used, to age related keywords over time, and thereby improve a relevancy of the identified related keywords to the given search term. Thus, relevancy is dependent upon a time window as well as a co-occurrence of words within a life-stream update. In any event, keyword manager 355 may employ a process such as described below in conjunction with FIG. 4 to perform at least some of its actions.

Generalized Operation

Figure 4:
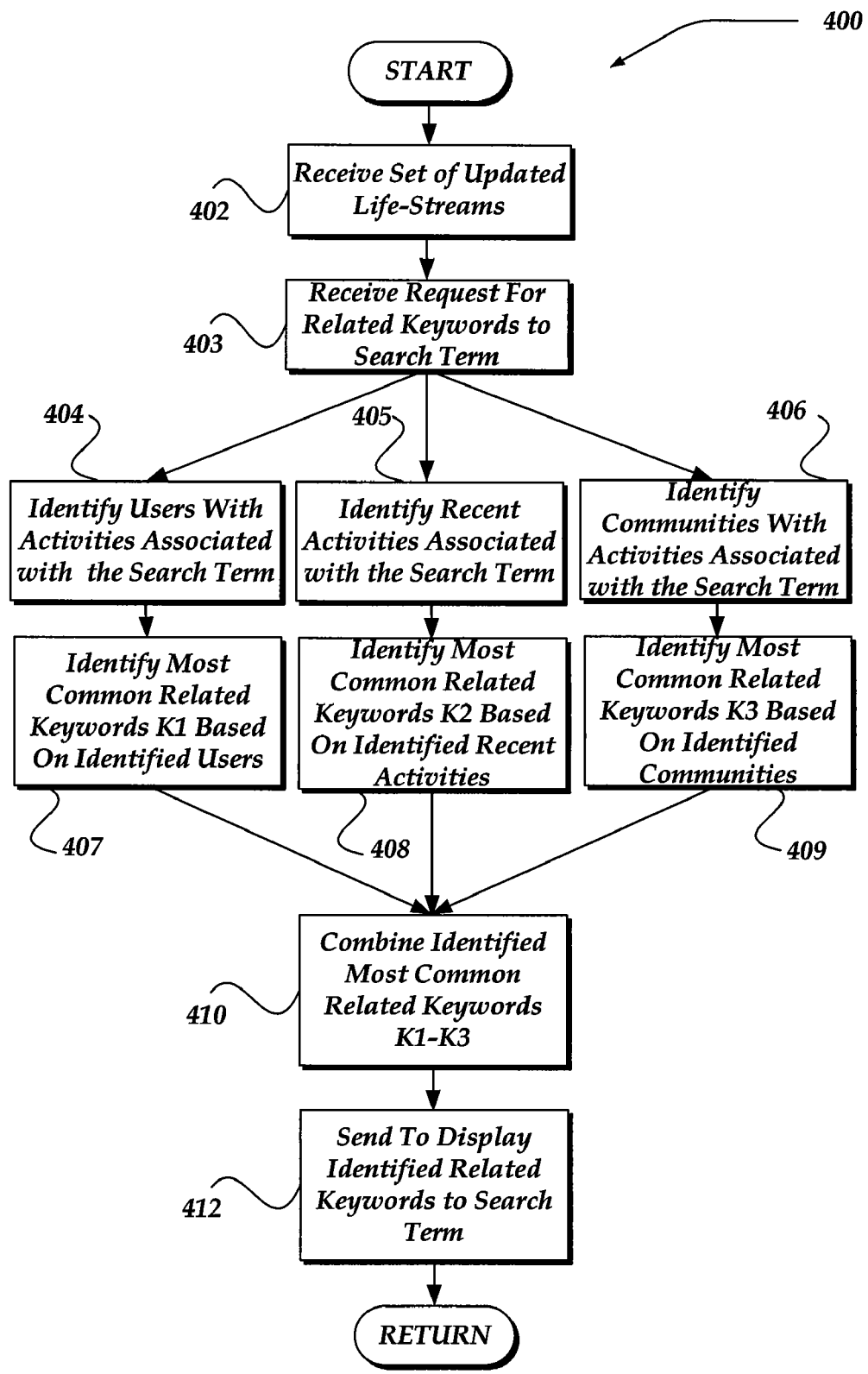
FIG. 4 illustrates a logical flow diagram generally showing one embodiment of an overview process for identifying related keywords to keywords entered by a searcher within a search query, where the related keywords are identified using life-stream feeds.

The operation of certain aspects of the invention will now be described with respect to FIGS. 4. FIG. 4 illustrates a logical flow diagram generally showing one embodiment of an overview process for identifying related keywords to keywords entered by a searcher within a search query, where the related keywords are identified using life-stream feeds. Process 400 of FIG. 4 may be implemented with LKSS 106 of FIG. 1.

Process 400 begins, after a start block, at block 402, where updated life-streams may be received. As noted above, updated life-streams include references to, and/or content that has been identified as being updated since a last time in which an aggregator searched for updates. In one embodiment, however, updates to a life-stream might also be identified to an aggregator through a message, alert, or the like, from a content service. Thus, the aggregator might be notified of an update to a service identified within a life-stream by the service, or search for and find an updated service identified within a life-stream. In one embodiment, other information might also be obtained at block 402, including, but not limited to user profile information, and identification of various communities, where a community might include one or more services associated with a particular topic, or subject of interest. For example, a community might be defined as those services, and/or content service sites associated with movies, while another community might be defined as those services and/or content service sites associated with another subject or topic, such as race cars, or the like. In one embodiment, such topic or subject might be identified through a tag, label, or other identifier for the content service site.

In one embodiment, the life-stream updates may include other life-streams that were identified as updated within a time period identified by a duration of a sliding window. That is, a sliding window of time might be used to discard updated life-streams outside of the update period. In another embodiment, the sliding window might represent a quantity of updates. Thus, in one embodiment, the sliding window might represent a number of updates between, for example, 80-200 life-stream updates. However, other values may also be selected. Thus, using the sliding window enables aging of older life-stream updates, while seeking to minimize large immediate changes to content. Therefore, in one embodiment, information obtained from the updates might be weighted to further affect aging of the updates. It should be noted that while such windowing can be performed globally at block 402, it might also be performed at blocks 404-406 below, for each of the various mechanisms.

In any event, processing may then flow to block 403, where a search term may be received for which related keywords are to be identified. In one embodiment, the search term might be obtained from a search query tool. However, as noted elsewhere, the search term might also be obtained from any of a variety of other mechanisms. For example, in one embodiment, the search term might be a term within a topical web page, a social-networking web page, or even within a message such as an email message, or the like. In any event, process 400 then proceeds using one or more of mechanisms to identify the related keywords. Thus, process 400 may flow to one or more of blocks 404-406.

Blocks 404 and 407 represent a user profile based analysis mechanism, wherein user profiles are analyzed to identify the users whose profiles may include the search term. Thus, at block 404, user profiles are analyzed for keywords, tags, or other information identifying the search term. For example, where the search term is "video" a search of user profiles for the updated life-streams is performed to identify those user profiles having the term "video" in it, explicitly or implicitly. Explicit data might include, for example, information, tags, or the like, that a user specifically adds about their own interests, while implicit data might include tags, labels, or the like, the user might add to activities or are derived from activities for which the user is posting. Moreover, a user profile may include more than life-stream information, and may also include, but is not limited to demographic information, explicit interests of a user, as well as information useable to determine implicit interests of the user.

In any event, identification of the user based on identifying the search term within a user's profile provides a set of user profiles. This subset of user profiles are provided to block 407, where a list of keywords within the content associated with the life-stream updates, and other user profile information, are identified. An analysis is then performed to determine a frequency of use of the keywords in the list of keywords. Such keywords may be identified as having been associated with the content for the life-stream update by the user posting the content (e.g., the content author), or added by a viewer/commenter of the content hosted by another user or explicitly interests specified by the users, and/or other activities by the user that may affect content within the user's profile. In one embodiment, where the content associated with the life-stream update and/or other user profile information is determined to not have tags, labels, or other keywords added, an analysis of the content may be performed to identify words within the content that may be used as keywords. In any event, the identified keywords may be side to co-occur with the search term in that they both appear within an updated profile content for a given user.

In a non-exhaustive, non-limiting example, it might be found that for several of the identified users, have identified activities associated with "music, television, and night-clubs," along with a plurality of other keywords. Moreover, "music, television, and night-clubs," might have been used by the plurality if users 300 times, 280 times, and 190 times, respectively. Other keywords might also be identified with various levels of frequency. Upon completion of block 407 processing flows to block 410.

Blocks 405 and 408 represent an aggregated life-stream analysis, wherein the plurality of life-stream updates across a plurality of users is searched to identify a subset of life-stream updates having the given search term. Unlike the user profile mechanism, this approach is independent of a given user profile or user and instead aggregates all users. Thus, all users' life-stream updates within the sliding window are searched for the occurrence of the search term. A subset of life-stream updates are then identified which have included as a keyword, tag, label, or the like, the search term.

Processing then flows to block 408, where other keywords within the subset of life-stream updates are identified. That is, if the search term is "bankruptcy," then the subset of life-stream updates are those life-stream updates that include the keyword "bankruptcy." Other keywords are then identified and a frequency of use of each of the other keywords is determined. Processing then flows to block 410.

Blocks 406 and 409 represent a third analysis mechanism, known as a community based life-stream analysis. At block 406 communities are searched to identify communities that have the search term used within their respective life-stream content/services from within the life-stream updates. The subset of communities is then provided to block 409, where other co-occurring keywords within the identified communities are identified. A frequency for each of the identified keywords is also determined. Processing then flows to block 410.

At block 410, the keywords from blocks 407-409 are combined, weighted, and sorted based on their frequency, weighting, or the like. For example, the weighting might be based on enabling a higher emphasis on keywords obtained from one mechanism over another mechanism. The weighting might also be configured to place higher weighing on keywords, phrases, or the like, that an administrator would prefer to have emphasized. For example, keywords that might result in a particular advertiser's product or service to be searched might be provided with an increase weighting. In any event, the keywords may then be sorted based on the weighting, frequency or the like. In one embodiment, all keywords having a frequency of co-occurrence with the search term above some threshold value might be provided to block 412. In another embodiment, a selected number of keywords might be provided, such as 5, 10, or the like (other numbers may also be selected).

At block 412, the identified related keywords to the search term are sent to a client device for display. In one embodiment, the related keywords may be displayed with a user interface screen along with the search term, such as described below in conjunction with FIG. 5. Upon completion of block 412, processing may return to a calling process to perform other actions.

Figure 5:
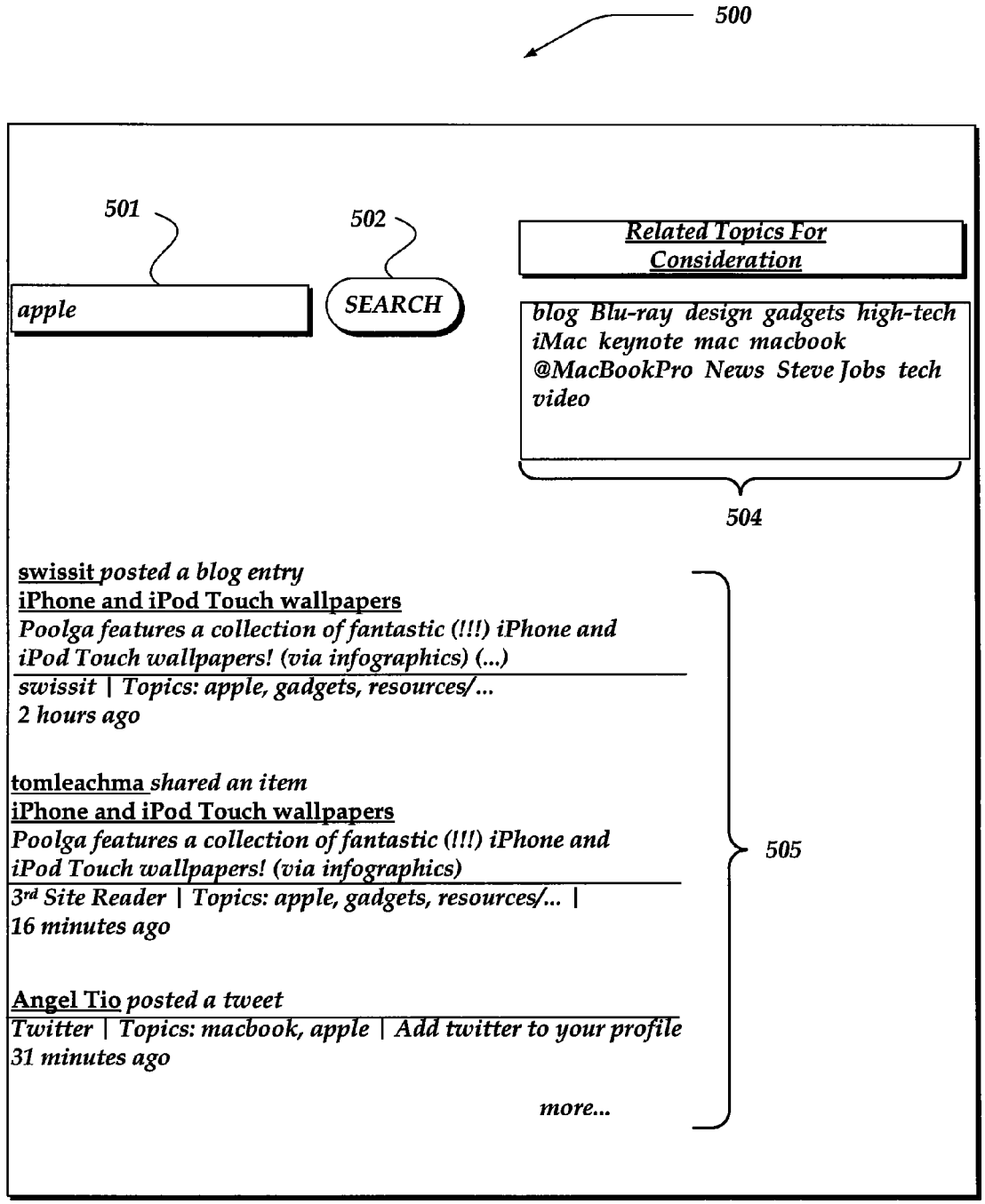
FIG. 5 illustrates one embodiment of a non-limiting, non-exhaustive example of a screen shot showing identified related keywords based on an analysis of updated life-streams for co-occurrence of keywords with a search term.

FIG. 5 illustrates one embodiment of a non-limiting, non-exhaustive example of a screen shot showing identified related keywords based on an analysis of updated life-streams for co-occurrence of keywords with a search term. User interface screen 500 of FIG. 5 may include more or less components than illustrated. However, the components shown are sufficient to disclose an illustrative embodiment for practicing the present invention. As shown, screen 500 includes search terms 501, related keywords 504, and life-stream updates 505. Screen 500 also includes a search indicator 502 that is configured to enable a user to initiate a search based on the entered search terms 501.

As shown, based on a search query, life-stream updates 505 may result. Along with the life-stream updates 505, in one embodiment, related keywords 504 may also be shown, based on use of process 400 described above. In one embodiment, a user may select a related keyword within the related keywords 504. Selection of the related keyword might, in one embodiment, result in the selected keyword being added to the search terms in 501.

It is noted, that the invention is not limited by the illustrated arrangement of components within screen 500, and other arrangements are also envisaged. For example, the related keywords 504 might be illustrated directly below the search terms 501, without departing from the scope of the invention.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
   a transceiver to send and receive data over a network; and
   a processor that is operative to perform actions, including:
   identifying a plurality of updates to life-stream feeds;
   receiving a search query having at least one search term;
   examining the plurality of updates to life-stream feeds to identify a first subset of updates having the at least one search term as a keyword;
   examining user profiles associated with each of the plurality of user profiles to identify at a second subset of updates to life-stream feeds for which the respective user profile includes the at least one search term as a keyword;
   searching each of the first and the second subsets of updates to life-stream feeds to identify other keywords co-occurring with the at least one search term; and providing at least some of the identified keywords as related keywords to the at least one search term to a client device, such that at least one of the identified keywords is useable to modify the search query.

2. The network device of claim 1, wherein receiving the at least one search term further comprises receiving at least one other search term from within a web page.

3. The network device of claim 1, wherein the processor is operative to perform actions, further including:
examining the plurality of updates to life-stream feeds to identify a third subset of updates associated with at least one community of activities having at least one search term as a keyword;
searching the third subset of updates to life-stream feeds to identify additional keywords co-occurring with the at least one search term;
combining the additional keywords with the identified keywords from the first and the second subsets of updates to life-stream feeds; and
providing at least some of the identified keywords as related keywords from the combination of keywords of the first, second, and third subsets to the client device.

4. The network device of claim 1, wherein identifying other keywords co-occurring further comprises:
determining a frequency of occurrence of the identified other keywords;
sorting the identified other keywords based on the determined frequencies of occurrence; and
providing at least some of the sorted other keywords, by providing at least a first set of other keywords having a frequency of occurrence over a defined number.

5. The network device of claim 1, wherein identifying the other keywords co-occurring further comprises:
searching for explicit or implicit tags within content associated with the updated life-stream feeds for keywords entered by an author of the content, a viewer of the content, or determining keywords based on an analysis of the content.

6. The network device of claim 1, wherein the plurality of updates to life-stream feeds is examined virtually in real time such that the related keywords are determined to have a time relevancy.

7. A system that is operative to manage a search query, comprising:
an aggregator configured to crawl a plurality of network sites to retrieve updates to content at one or more of the plurality of network sites and provide a plurality of updates to life-stream feeds; and
a keyword management component having computer-executable instructions, the computer-executable instructions when installed onto a computing device enable the computing device to perform actions, comprising:
receiving a search query having at least one search term;
examining the plurality of updates to life-stream feeds to identify a first subset of updates associated with at least one community of activities having the at least one search term as a keyword;
examining user profiles associated with the plurality of profiles to identify at a second subset of updates to life-stream feeds for which the respective user profile includes the at least one search term as a keyword;
searching each of the first and the second subsets of updates to life-stream feeds to identify other keywords co-occurring with the at least one search term;
sorting the identified other keywords based on a frequency of occurrence of the other keywords; and
providing at least some of the sorted keywords as related keywords to the at least one search term to a client device, such that at least one of the identified keywords is useable to modify the search query.

8. The system of claim 7, wherein the keyword management component enables the computing device to perform actions, further comprising:
examining the plurality of updates to life-stream feeds to identify a third subset of updates having the at least one search term as a keyword;
searching each of the third subset of updates to life-stream feeds to identify other keywords co-occurring with the at least one search term; and
combining the identified keywords from the searching of the first, second, and third subsets to generate another set of related keywords that are ordered based on a frequency of occurrences in the first, second, and third subsets.

9. The system of claim 7, wherein the plurality of updates to life-stream feeds is determined as updates to content for life-stream feeds within a sliding window.

10. The system of claim 7, wherein sorting the identified other keywords further comprises weighting the other keywords based on whether the keywords are identified from the first subset or the second subset.

11. The system of claim 7, wherein sorting the identified other keywords further comprises weighting the other keywords to modify a position in the sort order of at least one other keyword associated with an advertiser.

12. A computer-readable storage medium having computer-executable instructions, the computer-executable instructions when installed onto a computing device enable the computing device to perform actions, comprising:
receiving a search query having at least one search term;
examining a plurality of updates to life-stream feeds to identify a first subset of updates associated with at least one community of activities having the at least one search term within associated content;
examining user profiles associated with the plurality of profiles to identify at a second subset of updates to life-stream feeds for which the respective user profile includes the at least one search term within associated content or user profile;
searching each of the first and the second subsets of updates to life-stream feeds to identify keywords co-occurring with the at least one search term;
sorting the identified keywords based on a frequency of occurrence of the other keywords; and
providing at least some of the identified keywords as related keywords to the at least one search term to a client device, such that at least one of the identified keywords is useable to modify the search query.

13. The computer-readable storage medium of claim 12, wherein the plurality of updates to life-stream feeds is determined based further on a sliding window.

14. The computer-readable storage medium of claim 12, wherein sorting the identified keywords further comprises modifying a sort order to emphasize a keyword associated with an advertiser.

15. The computer-readable storage medium of claim 12, wherein the computer-executable instructions enable the computing device to perform actions, further comprising:
examining the plurality of updates to life-stream feeds to identify a third subset of updates having the at least one search term in associated content;

searching the third subset of updates to life-stream feeds to identify other keywords co-occurring with the at least one search term; and combining the identified other keywords from the search of the third subset with the identified keywords from the first and second subset.

16. The computer-readable storage medium of claim 12, wherein a keyword is identified based on at least one of a tag, a label, or a result of an analysis of associated content or user profile.

17. A method that modifies a computing device such that the computing device is enabled to perform a search query, comprising:

receiving a plurality of updates to content from life-stream feeds;

receiving a search query having at least one search term;

examining the plurality of updates to content from life-stream feeds to identify a first subset of updates having the at least one search term as a keyword;

examining the plurality of users to content from profiles to identify at a second subset of updates for which the respective user profile includes the at least one search term as a keyword;

searching each of the first and the second subsets to identify other keywords co-occurring with the at least one search term;

sorting the identified other keywords based on a frequency of occurrence in the subsets; and providing at least some of the sorted keywords as related keywords to the at least one search term to a client device, such that at least one of the identified keywords is useable to modify the search query.

18. The method of claim 17, wherein sorting the identified other keywords further comprises modifying a sort order to emphasize a keyword associated with an advertiser.

19. The method of claim 17, wherein the plurality of updates to life-stream feeds is examined virtually in real time such that the related keywords are determined to have a time relevancy.

20. The method of claim 17, wherein the plurality of updates to life-stream feeds is determined based on a sliding window that is configured to age out updates to life-stream feeds over time.

* * * * *